(12) United States Patent
Pasti

(10) Patent No.: US 6,520,235 B1
(45) Date of Patent: Feb. 18, 2003

(54) CALENDERING OF POLYMERIC VINYL FILMS EXHIBITING HIGH GLOSS AND STRUCTURAL STABILITY

(75) Inventor: Claude Pasti, Ecaussinnes (BE)

(73) Assignee: Morgan Adhesives Company, Stow, OH (US)

( * ) Notice: Subject to any disclaimer, the term of this patent is extended or adjusted under 35 U.S.C. 154(b) by 45 days.

(21) Appl. No.: 09/634,433

(22) Filed: Aug. 8, 2000

Related U.S. Application Data

(60) Provisional application No. 60/147,796, filed on Aug. 9, 1999.

(51) Int. Cl.[7] ............................................. B29C 67/00
(52) U.S. Cl. ..................................................... 156/501
(58) Field of Search ............................ 156/230, 244.11, 156/242, 437, 501, 323, 247; 264/175

(56) References Cited

U.S. PATENT DOCUMENTS

| | | | | |
|---|---|---|---|---|
| 2,771,388 A | * | 11/1956 | Rocky et al. | 156/231 |
| 3,050,428 A | * | 8/1962 | Girtanner | 156/231 |
| 3,849,174 A | * | 11/1974 | Ancker | 156/244.11 |
| 4,462,852 A | * | 7/1984 | Custor | 264/175 |
| 4,681,723 A | * | 7/1987 | Jester | 156/244.11 |
| 4,913,760 A | * | 4/1990 | Benson et al. | 156/244.11 |
| 5,609,685 A | * | 3/1997 | Fux | 118/117 |

* cited by examiner

Primary Examiner—Michael W. Ball
Assistant Examiner—Barbara J Musser
(74) Attorney, Agent, or Firm—Renner, Kenner, Greive, Bobak, Taylor & Weber

(57) ABSTRACT

A method and apparatus for calendering polymeric vinyl films exhibiting high gloss and structural stability. Specifically, the invention presents a method and apparatus for calendering polyvinyl chloride film of such a nature. In accordance with the invention, a casting sheet is interposed within the calendering head wherein a blend of polyvinyl chloride resin is formed, in standard fashion, into a continuous film web. In accordance with one embodiment of the invention, the casting sheet, preferably of heat resistant polyester film, is introduced into a nip between existent processing rolls near the end of the processing head. Alternatively, a separate nip may be provided by the addition of a separate roll in juxtaposition to a final roll in the calendering head. In either instance, the casting sheet is forcefully applied to the polyvinyl chloride film prior to engagement with the embossing rolls of the manufacturing process.

6 Claims, 3 Drawing Sheets

CALENDERING OF POLYMERIC VINYL FILMS EXHIBITING HIGH GLOSS AND STRUCTURAL STABILITY

This application claims the benefit of Provisional application Ser. No. 60/147,796, filed Aug. 9, 1999.

TECHNICAL FIELD

The invention herein relates to polymer films and to the enhancement of the mechanical and aesthetic properties of such films. More particularly, the invention relates to an improved method of manufacture of calendered plasticized polyvinyl chloride films with enhanced surface gloss and shrinking resistance.

BACKGROUND ART

Polyvinyl chloride (PVC) films are used in a variety of decorative applications such as advertising and point of purchase signage, architectural trim and automotive trims. Vinyl films produced by a casting process are particularly suited to these applications because of their high surface gloss. However, calendering processes are more cost effective than casting processes for producing polyvinyl chloride films. But, the surface gloss of calendered films is less than that of cast films. This reduced gloss appearance makes calendered films aesthetically unattractive in many applications. This appearance is particularly evident and visible in dark-colored films.

Attempts to enhance the gloss of calendered polymeric vinyl films through changes in resin formulation are known in the art. The use of lower molecular weight vinyl resins typically provide higher gloss levels in calendered film, but lead to an undesirable loss of tensile and tear strength of the finished product. Gloss can also be enhanced by mixing with the vinyl resin a minor portion of an organopolysiloxane. Incorporation of copolymers of acrylic or methacrylic acid and methyl methacrylate also are known to improve the gloss and surface appearance of calendered vinyl films. However, the addition of gloss enhancing resins increases the costs of finished films in which they are incorporated. The present invention does not require the use of expensive additives to achieve high surface gloss levels.

Enhancing the gloss of calendered vinyl films through process modifications is also known in the art. Roll surfaces in the calender stack, especially the embossing roll, can be finished to a high degree of gloss or surface smoothness. This surface smoothness is imparted to the vinyl film as it passes through the calender stack. However, the smooth finish rolls contribute to poor parting characteristics. They also lack the differential coefficient of friction necessary to draw the calendered film smoothly and evenly through the process and into a finished roll. The present invention does not rely on polished calender roll surfaces to achieve gloss and, therefore, avoids the foregoing problems.

The use of coatings and different types of interlayered films to maintain surface gloss, reduce wrinkles and prevent blocking of vinyl films is also known in the art. For example, winding a polypropylene film into a finished roll of calendered vinyl will prevent blocking and loss of surface gloss and smoothness. However, this technique adds the expense of a separate converting step and does not offer the possibility of raising the gloss of the vinyl film beyond that which was achieved directly after the film's manufacture. Moreover, they do not improve mechanical properties of the films on which they are used, especially shrinkage resistance.

The process of calendering was originally developed in the rubber industry for the continuous manufacture of natural and synthetic rubber sheeting, and was later adapted to the manufacture of films and sheets of synthetic thermoplastics such as vinyl chloride homopolymers and copolymers, cellulose acetate, and, to a limited extent, polyethylene and other polyolefins. During the calendering of thermoplastic raw materials such as polyvinyl chloride resins, plasticizer and fillers are fluxed into a rubber-like mass and then passed through a series of nips formed by a number of heated cooperating rolls to form a continuous film, sheet, or web of specified width and thickness. The resulting film is wound into large rolls as finished products or for additional processing steps.

During calendering, the heated web or film is subjected to longitudinal and transverse stresses developed during removal of film from the final roll of the calender stack and during winding of finished rolls of film. This stress can exceed the yield point of the film and introduce excess residual strain in the finished film. In many applications it is desirable to provide calendered sheets having a low degree of residual strain. Too much strain can lead to problems such as distortion or excess shrinkage of the calendered sheet in its ultimate end use. In normal calendering methods and apparatus, it is necessary to resort to various undesirable practices in order to meet specifications calling for calendering sheets having low strain. Most of such practices involve the lowering of production rates, which is highly undesirable.

The control of strain of the calendered film is typically a function of the stripper rolls. These are the rolls which take the sheet or film away from the final calender roll, and their construction, alignment, speed and temperature control are critical. However, the stripper rolls can cause the sheet or film to release more easily from the edges of the calender roll than from the center, resulting in uneven strain and uneven gauge in the sheet or film.

It has therefore been found beneficial to produce a calendered polyvinyl chloride film with low strain and enhanced mechanical properties, especially shrinkage resistance, and with high levels of surface gloss. The present invention incorporates some of the advantages of the existing technology, while alleviating several of the problems associated therewith.

SUMMARY OF INVENTION

It is a primary objective of the present invention to provide a method and apparatus for enhancing the surface gloss of calendered plasticized polymeric film. Another objective of the present invention is to provide a method and apparatus for reducing strain and improving the shrinkage of such films by maintaining their structural integrity both during manufacture and thereafter.

In the preferred embodiment, the invention utilizes a thin, flexible continuous sheet of polyester film that is brought into intimate contact under heat and pressure with polyvinyl chloride film during the calendering process. The process temperature and pressure cause the calendered PVC film to conform intimately to the polyester sheet, thus imparting the high gloss and smooth surface properties of the polyester film to the calendered PVC film. The polyester carrier film remains in intimate contact with the calendered PVC film as it cools. In this way the smooth surface characteristics achieved during the manufacturing process are retained during storage and subsequent processing of the finished film.

The foregoing and other aspects of the invention are achieved by an apparatus for calendering polymeric vinyl films, comprising: a calendering head for receiving a resin blend and forming a hot film therefrom; an embossing station receiving said hot film; and a casting sheet applicator introducing a casting sheet to said hot film prior to transfer to said embossing station.

Other aspects of the invention are achieved by a process for calendering polymeric vinyl films, comprising: introducing a resin blend into a calendering head and forming a hot film therefrom; applying a casting sheet to said hot film; and passing said casting sheet carrying said hot film through an embossing station.

BEST MODE FOR CARRYING OUT THE INVENTION

Figure 1:
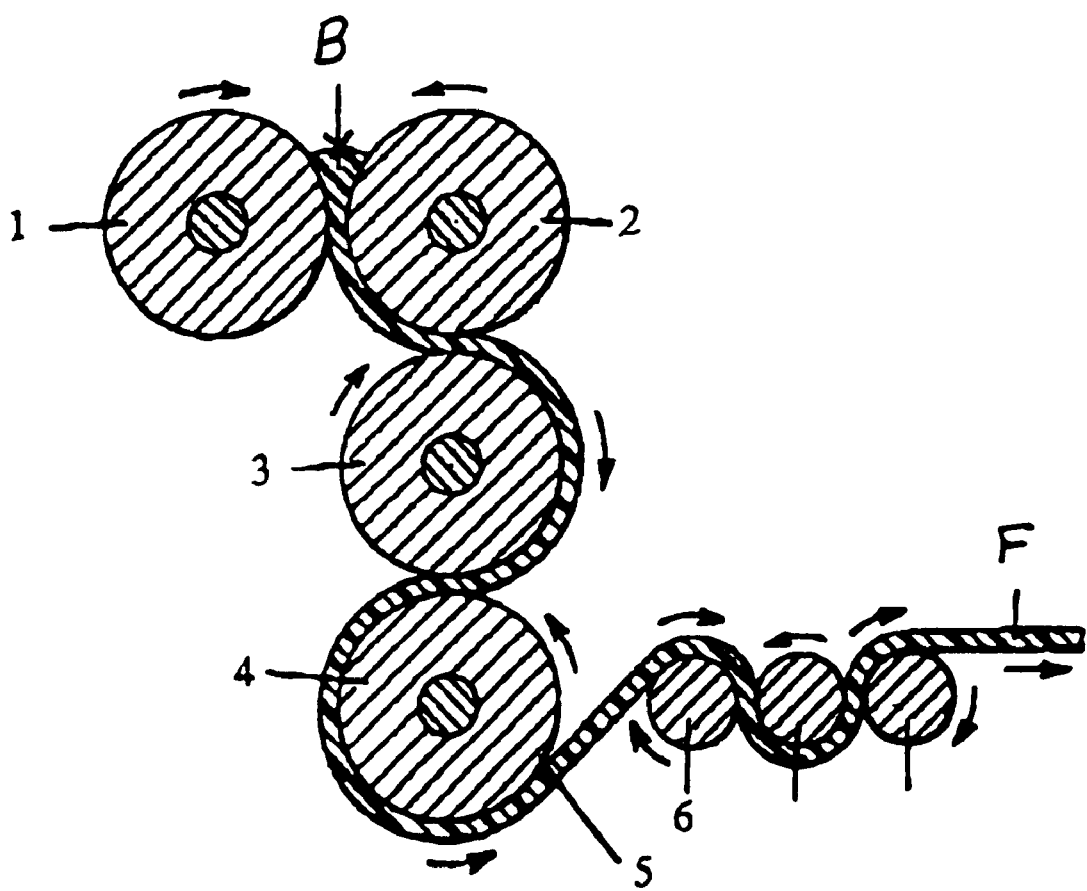
FIG. 1 is a calendering head of a calendering machine as used in accordance with the invention.

Referring to FIG. 1, film formation occurs with the passage of the polyvinyl chloride resin blend B between rolls 1, 2, 3, and 4 of the calendering head. These rolls are heated to temperatures preferably ranging from 160° C. to 200° C. The film F thus formed leaves the calendering head at point 5 and reaches the embossing station 6. Between points 5 and 6 the film formed is very hot and thus very sensitive to any mechanical stress.

Figure 2:
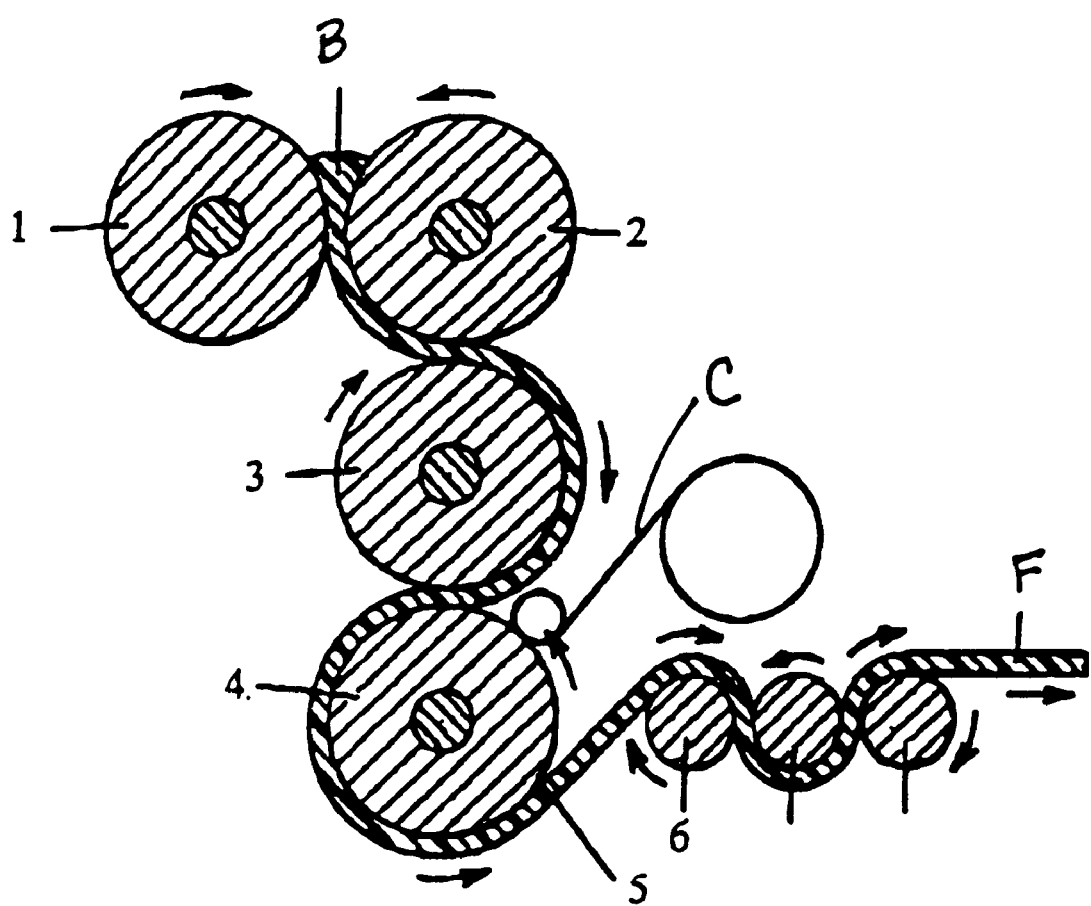
FIG. 2 is an illustration of the preferred method of introducing a carrier film in practicing the invention.

In accordance with the present invention, a thin, flexible, elevated temperature resistance casting sheet is introduced to support the PVC film thus formed as it leaves roll 4 of the calender stack. As shown in FIG. 2, in accordance with the preferred embodiment of the invention, the casting sheet C is introduced from a supply roll 8 and applied to the roll 3 by a nip roll 7 just prior to the nip point between rolls 3 and 4. In the preferred embodiment, the casting sheet C is polyester film. Such films are well known in the art. As shown in FIG. 2, it is most preferred that the casting sheet C pass between rolls 3 and 4 of the calender stack. Being hot laminated, the thermoplastic PVC will acquire the surface gloss and brightness characteristics of the casting against which it is laminated under the heat and pressure of the calender nip. Moreover, the PVC film F produced using this method will retain these surface gloss properties after the polyester casting sheet C is removed during a subsequent converting process.

Figure 3:
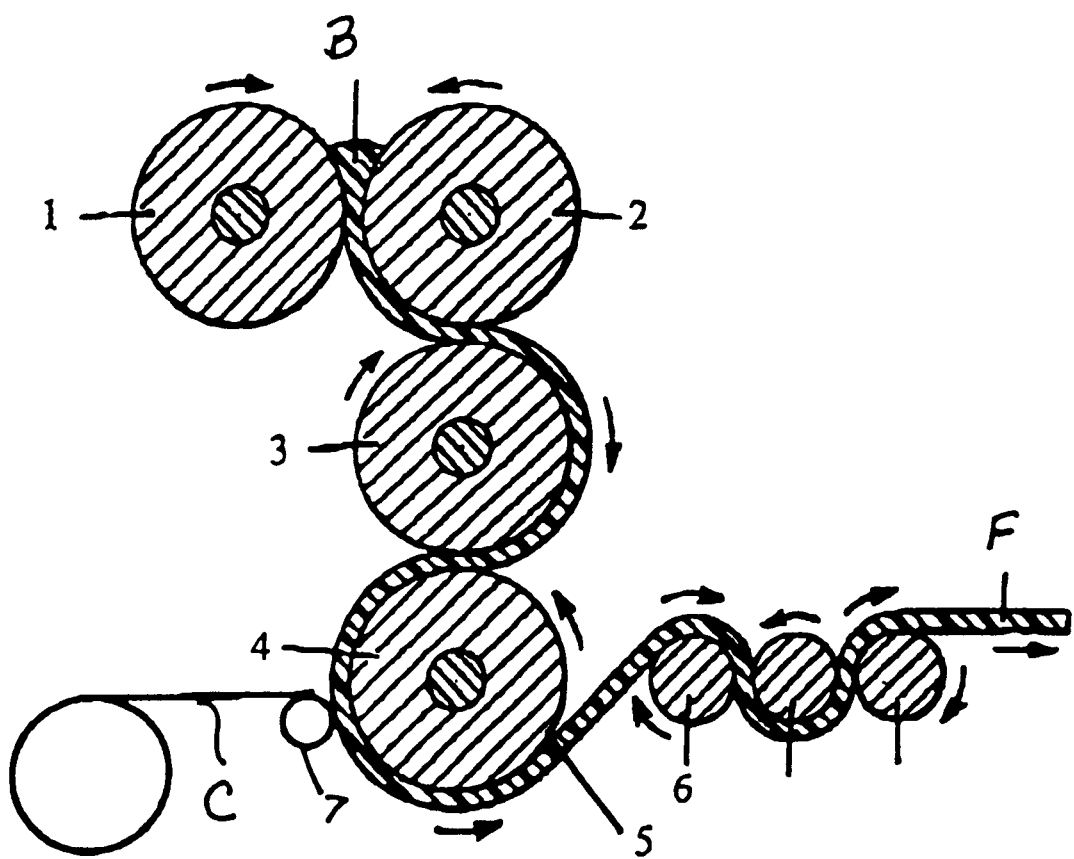
FIG. 3 is an illustration of an alternate method of introducing a carrier film in practicing the invention.

As shown in FIG. 3, there is an alternate embodiment in which the casting sheet is introduced after the PVC film exists the nip point between rolls 3 and 4 of the calender stack. In FIG. 3, the casting sheet must be firmly pressed against roll 4 in order that the PVC sheet acquire the surface smoothness and brightness of the casting sheet. This may be achieved by the development of a pressure or nip point as between roll 7 and roll 4 in any appropriate fashion.

Thus it can be seen that the objects of the invention have been satisfied by the apparatus and process set forth above. While in accordance with the patent statutes only the best mode and preferred embodiment of the invention has been presented and described in detail, the invention is not limited thereto or thereby. Accordingly, for an appreciation of the true scope and breadth of the invention, reference should be made to the following claims.

What is claimed is:

1. Apparatus for calendering polymeric vinyl films, comprising:

a source of a resin blend of polyvinyl chloride;

a calendering head receiving said resin blend of polyvinyl chloride from said source thereof and forming a hot film therefrom;

an embossing station receiving said hot film;

a source of a polyester casting sheet;

a casting sheet applicator receiving the polyester casting sheet from said source thereof and introducing said polyester casting sheet to said hot film prior to transfer to said embossing station whereat the hot film of polyvinyl chloride intimately conforms to the polyester casting sheet to obtain the high gloss surface property of the polyester casting sheet; and a stripping station for subsequently removing said polyester casting sheet.

2. The apparatus for calendering polymeric vinyl films according to claim 1, wherein said calendering head comprises a plurality of rolls through which the resin blend and hot film passes, said casting sheet applicator applying said polyester casting sheet to one of said plurality of rolls.

3. The apparatus for calendering polymeric vinyl films according to claim 2, wherein said polyester casting sheet is applied to said one of said plurality of rolls at a point prior to a calender nit.

4. The apparatus for calendering polymeric vinyl films according to claim 3, wherein heat and pressure of said calender nip laminates said hot film to said polyester casting sheet.

5. The apparatus for calendering polymeric vinyl films according to claim 1, wherein said calendering head comprises a plurality of rolls through which the resin blend and hot film passes, said casting sheet applicator applying said polyester casting sheet to said hot film as it exits said calendering head and prior to said embossing station.

6. The apparatus for calendering polymeric vinyl films according to claim 5, wherein said casting sheet applicator comprises a roll of polyester casting sheet and a nip roll, said nip roll effecting a pressure application of said polyester casting sheet to said hot film.

* * * * *